Sept. 22, 1953   B. S. McKINLEY   2,653,298
APPARATUS FOR MEASURING MOISTURE CONTENT
OF A TRAVELING LAYER OF MATERIAL
Filed April 9, 1951   2 Sheets-Sheet 1
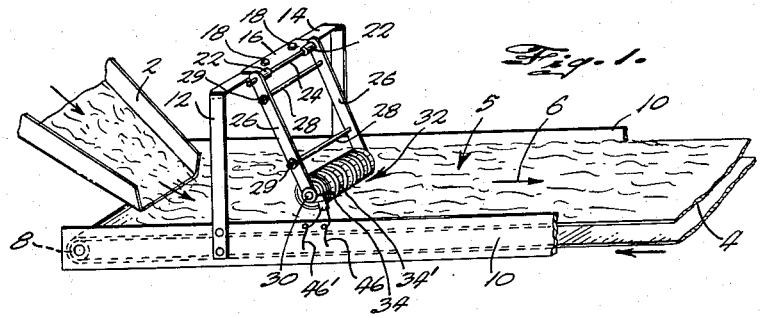
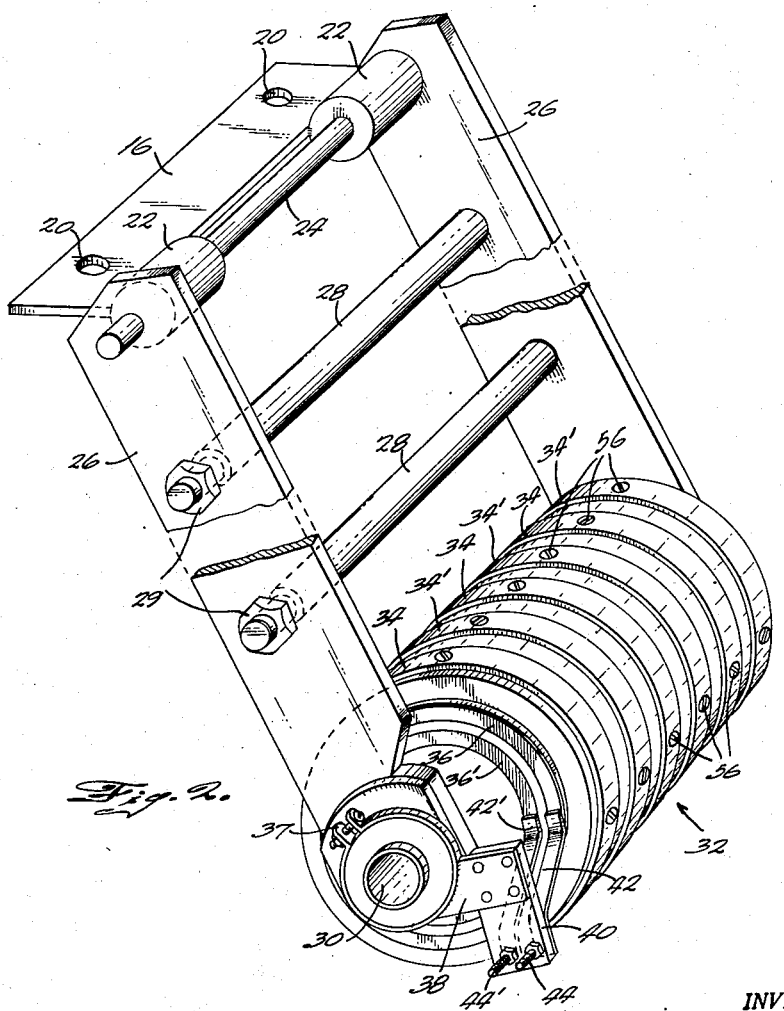
INVENTOR.
BILLY STEWART McKINLEY
BY
James and Franklin
ATTORNEYS.

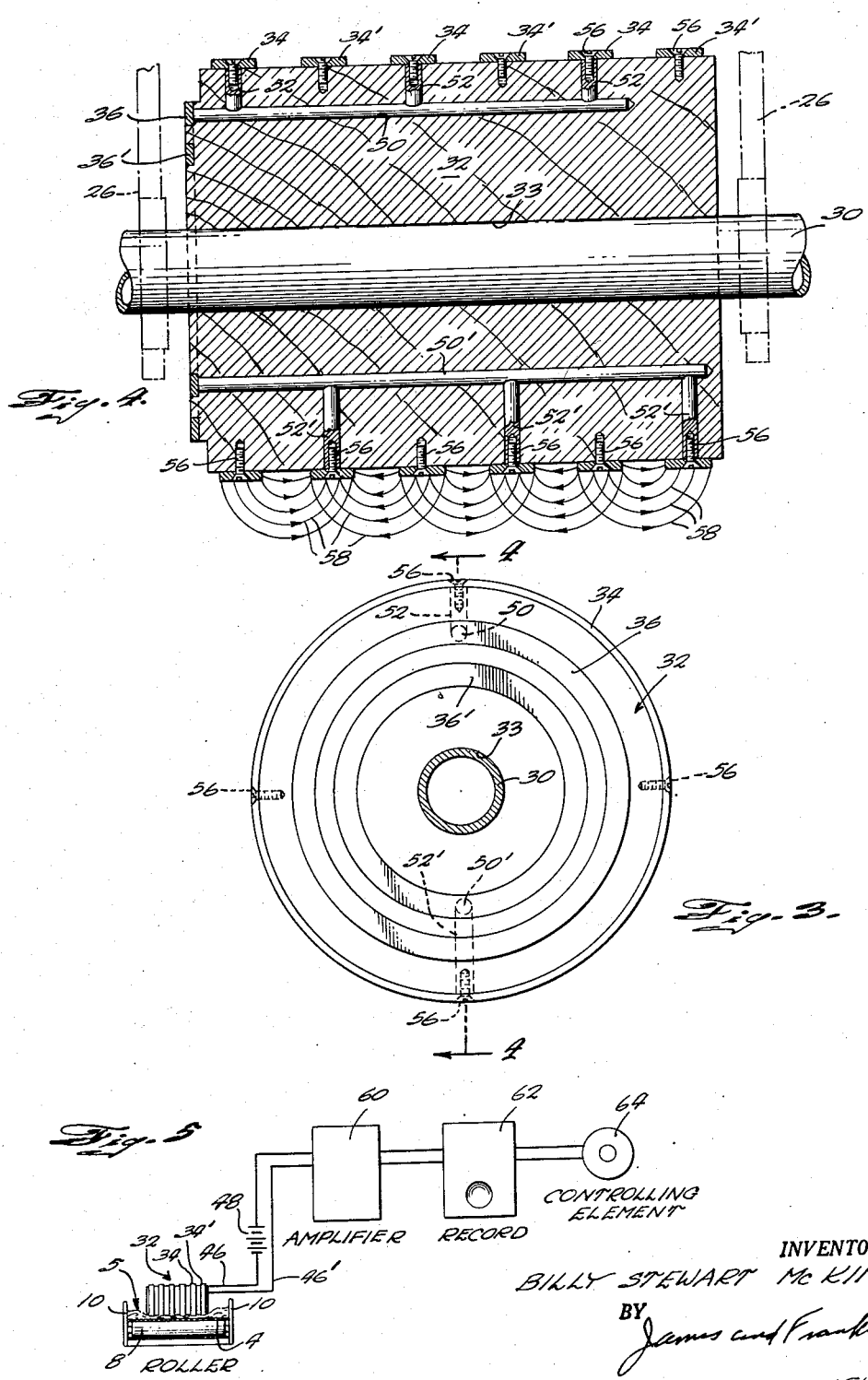

Patented Sept. 22, 1953

2,653,298

UNITED STATES PATENT OFFICE 2,653,298

APPARATUS FOR MEASURING MOISTURE CONTENT OF A TRAVELING LAYER OF MATERIAL

Billy Stewart McKinley, Louisville, Ky., assignor to Brown and Williamson Tobacco Corporation, Louisville, Ky., a corporation of Delaware Application April 9, 1951, Serial No. 219,908

8 Claims. (Cl. 324—65)

1

The present invention relates to apparatus designed to continuously measure the moisture content of a moving layer of material, and is particularly adapted for use where the thickness of that layer is uneven and subject to variation.

It has been known that the moisture content of various substances can be determined through measurement of the electrical resistance of the substance, the resistance varying with the proportion of moisture in the substance in question. Determination of moisture content is an important factor in many industrial operations, and the resistance measurement method of moisture determination has been used in several industrial applications. However, all of the applications in which that method has proved feasible have involved a measurement of the moisture content of articles the dimensions of which are fixed, uniform and known. Thus, the moisture content of long sheets of paper has been determined by measuring the resistance of the sheet through its thickness, from the top of the paper to the bottom, the thickness of the paper being uniform throughout its entire length.

There are many industrial applications where measurement of moisture content is desired but where the dimensions of the substance being measured are not fixed, uniform or known. Since the distance between the current carrying electrodes between which the substance to be tested is passed will have an obvious effect on the electrical resistance measured between those electrodes, the use of the electrical resistance method has not heretofore proved practical in those situations where the dimensions of the products being tested are not fixed and constant.

Such has particularly been the case when it is desired to determine the moisture content of a traveling layer of particulate material of any character, be it granular, flaky, lumpy, formed of large and irregular pieces, or whatever. Such material requires some bottom support such as a conveyor belt, and it is as a practical matter impossible to have the thickness of the layer on the belt constant at all times. Thus any attempt to measure the electrical resistance of that layer of material by placing electrodes at the top and bottom thereof is unsatisfactory, since the characteristics of the conveyor belt must be taken into account (they will often be non-constant along its length, and hence will introduce a factor of uncertainty into the measurement), and since the thickness of the layer of material will vary in a random manner, thus giving rise to non-uniformity of measurement.

These problems are particularly difficult when material such as tobacco is being treated. Tobacco rag and tobacco leaf, before it is incorporated into a saleable smoking mixture, must have its moisture content closely controlled. The usual way in which this is done is to pass the rag or leaf through a dryer. It is possible, of course, to take samples of a given batch of tobacco, measure its moisture content through conventional chemical or physical methods, and then treat the batch accordingly insofar as drying is concerned. However, because of the variations in moisture content within a given batch, a sampling procedure of the above type results only in an approximation. Moreover, it may require delay in operation, or it may involve a time lag between moisture content determination and appropriate action which will unfavorably affect the ultimate result. The physical nature of tobacco rag and leaf is such that, no matter what pains may be taken in an attempt to produce a layer of that material having a constant thickness, such a result is never attainable. Moreover, even at a given cross-section of a layer of such material, the top and bottom surfaces of that layer are irregular, and hence any attempt to determine moisture content through resistance measurement from the top of the layer to the bottom will be inadequate.

I have devised an apparatus which will permit the use of resistance measurement to determine moisture content of traveling layers of particular material, such as, for example, tobacco rag or tobacco leaf, independently of the thickness of the layer or the surface irregularities thereof. This apparatus will, moreover, operate in a continuous manner, so that the moisture content of the material which makes up the layer can be instantaneously determined at all times.

This is done by measuring the resistance of the material from one point on its top surface to another point on the top surface, the current path penetrating the layer only slightly, so that the resistance measurements will be dependable whatever may be the thickness of that portion of the layer in instantaneous contact with the measuring device. The measuring device is so mounted that it rides on, and preferably rolls over, the layer of material as that material moves thereunder, and can rise or fall to conform to the instantaneous thickness of the material without in any way affecting the accuracy of its measurement.

The device in question is simple and inexpensive, and may be used either to record the moisture content, indicate the moisture content so that appropriate manipulations of auxiliary equipment may be manually made, or even automatically control those manipulations, all in a continuous, accurate and dependable manner.

To the accomplishment of the above and to such other objects as may hereinafter appear, the present invention relates to the measuring apparatus as defined in the appended claims and as described in this specification taken together with the accompanying drawings in which:

Fig. 1 is a perspective view, partially broken away, showing the device of the present invention in use for the measurement of the moisture content of a traveling layer of tobacco;

Fig. 2 is a perspective view on an enlarged view, partially broken away, of the material-engaging element of the apparatus;

Fig. 3 is an end elevational view of the rotating member thereof;

Fig. 4 is a cross-sectional view taken along the line 4—4 of Fig. 3, the current paths being indicated thereon in exaggerated form; and Fig. 5 is a schematic view illustrating one manner in which the device of the present invention may be employed.

The apparatus of my invention is here specifically disclosed as used in the continuous measurement of the moisture content of tobacco rag and tobacco leaf as those substances are fed to a dryer, but it will be understood that the invention has application for use with many other substances.

The tobacco, on its way to a dryer where its moisture content is reduced to a desired level, may fall down a chute 2 onto an endless conveyor belt 4 moved in the direction of the arrow 6, that belt being tensioned over rollers 8 (only one of which is shown) rotatably mounted between side walls 10 of a suitable supporting structure and driven by any suitable means. As the tobacco distributes itself on the belt 4 it forms a layer of tobacco 5 the thickness of which is quite irregular because of the nature of the material employed. The thickness of that layer 5 varies widely along the length thereof and, at a given point along its length, even across the width thereof. The impracticability of using conventional resistance measurement methods for determination of the moisture content of such a layer of material is apparent.

In the apparatus of the present invention a frame is secured to the side walls 10, that frame consisting of a pair of uprights 12 connected by a cross bar 14. A strap 16 is secured to the cross bar 14 by means of bolts 18 passing through apertures 20 in the strap 16, said strap being provided with collars 22 within which shaft 24 is mounted. A bracket defined by the parallel arms 26 is pivotally mounted on the shaft 24, the arms 26 extending downwardly from the shaft 24 toward the conveyor belt 4 and being somewhat longer than the vertical distance between the shaft 24 and the conveyor belt 4. If desired, stiffening struts 28, held in place by nuts 29, may be secured between the arms 26.

A shaft 30 is mounted between the arms 26 near their lower extremity, and a roller generally designated 32 is mounted on the shaft so as to be rotatable with respect to the arms 26, the periphery of the roller 32 extending below the arms 26 so that it may come into contact with the upper surface of the layer 5 of tobacco which is carried under it by the conveyor belt 4.

The roller 32 is preferably in the form of a drum of insulating material, such as wood, having an axial aperture 33 through which the shaft 30 passes. The periphery of the drum is provided with a plurality of rings 34, 34' of conductive material such as copper, those rings being coaxial with the axis of the drum 32 and spaced uniformly from one another along the length of the drum 32. The side of the drum 32 is provided with a pair of conductive slip rings 36, 36' concentric with one another and with the axis of the drum 32, the slip ring 36 being electrically connected to alternate contact rings 34 while the slip ring 36' is electrically connected to other and alternate contact rings 34'. Mounted on one of the arms 26 by means of clamp 37 is a bracket 38 to which an insulating mounting block 40 is secured, stationary electrical brushes 42, 42' being secured thereto by means of screws 44, 44' and engaging and making sliding contact with the slip rings 36 and 36' respectively. Leads 46 and 46' are electrically connected to the brushes 42 and 42' respectively via the screws 44, 44', and these leads are connected in an electrical circuit including a source of electric potential such as the battery 48 and any appropriate device 60 for measuring the resistance of the circuit thus defined.

I have found it advantageous to provide the electrical connection between the slip rings 36, 36' and the respective contact rings 34, 34' by forming the drum 32 with a pair of bores 50, 50' each parallel to the axis of the drum 32 and in line with and extending to appropriate ones of the slip rings 36, 36'. As here disclosed, these bores 50, 50' are diametrically opposite one another. Additional sets of bores 52 and 52' are provided perpendicular to the axis of the drum 32, each set being spaced from the other set around the periphery of the drum 32 preferably corresponding to the relative positions of the bores 50, 50', the position of each of the bores of a given set along the length of the drum 32 corresponding to the positions along the length of the drum 32 which the contact rings 34 and 34' respectively will assume, and extending from the periphery of the drum to the bores 50 and 50' respectively. These bores 50, 50', 52, 52' may be filled with an electrically conductive material either in the form of unitary segments press fitted or otherwise secured in the bores, or else melted and poured into the bores, in either case so as to define a continuous line of electrical connection.

The contact rings 34, 34' may be secured in position on the drum 32 by means of a series of screws 56 disposed at appropriate intervals around the periphery of the drum 32, these screws being conductive and at least some of them engaging with the conductive material in the bores 52 and 52' respectively so as to define not only the means for securing the contact rings 34, 34' in position on the drum 32 but also a part of the means for electrically connecting the contact rings 34, 34' to the appropriate slip rings 36, 36'. This construction is simple, effective and inexpensive.

When in use the weight of the roller 32 and the arms 26 will cause said roller and arms to pivot in a clockwise direction as viewed in Fig. 1 so that the periphery of the roller is urged into contact with the upper surface of the layer 5 of tobacco on the conveyer belt 4. As the conveyer belt 4 moves in the direction of the arrow 6, the drum 32 will roll thereover, and the spaced contact rings 34, 34' will be in constant electric contact with the tobacco. The weight of the roller 32 will cause some compaction of the tobacco layer 5 (as shown in exaggerated form in Fig. 5), thus making for better electrical connection between one tobacco fragment and another, and compensating for some of the variation in thickness of the tobacco layer. As that thickness usually varies to a degree which cannot be wholly compensated for by the smoothing action of the roller 32, the mounting of the roller 32 will permit it to rise and fall in accordance with the instantaneous layer thickness below it. It may be desired, in some installations, to provide for resilient pressure of the roller 32 on the layer of material passing beneath it, but usually the weight of the roller 32 itself is sufficient.

The electrical path through the tobacco the resistance of which is being measured by the device is illustrated schematically by the lines 58 of Fig. 4. For purposes of clarity those lines extend below the contact rings 34 to an exaggerated degree. In point of fact the path which the current takes from one contact ring 34 to the adjacent contact ring 34' penetrates the thickness of the tobacco layer only slightly. This is particularly true when, as here, the contact rings 34, 34' project out from the periphery of the roller 32 so as to embed themselves partially in the layer of the material. Hence, the path through the tobacco the electrical resistance of which is measured is independent of the actual thickness of the layer of material over which the roller 32 is rolling, and since the rings 34, 34' are continuous, always in engagement with and electrically connected to the layer of tobacco, and always connected to the same side of the battery 48 by means of the slip rings 36, 36', measurement of the electrical resistance of the tobacco, and hence determination of its moisture content, is accurately and continuously achieved.

One system in which the apparatus of the present invention may be used is disclosed in Fig. 5. The resistance detecting unit 60 is a direct current amplifier which, in accordance with the detected resistance, controls an automatic recording device 62 to which it is electrically connected and also actuates a controlling element 64 which may, for example, control the amount of heat applied to the tobacco in the drying apparatus. As a result, the moisture content of the tobacco emerging from the dryer will be constant and at a predetermined level independently of the moisture content of the tobacco before it enters.

The mode of operation and advantages of the apparatus of the present invention will in the main be fully apparent from the above description. The apparatus is simple and inexpensive, is capable of use in many forms and in many systems, and is effective to accurately determine the moisture content of a traveling layer of material of uneven thickness in a dependable, continuous and instantaneous manner. It will be apparent that many variations may be made in the details of the apparatus, all within the spirit of the invention as defined in the following claims.

I claim:

1. Apparatus for continuously measuring the moisture content of a traveling layer of particulate material which comprises a movable conveyer belt or the like on which said particulate material is adapted to be carried in the form of a layer the thickness of which may vary, a roller urged toward said conveyer so as to be movable into engagement with the top surface of the layer of the material thereon, a pair of contact rings uniformly spaced apart on the layer-engaging surface of said roller and adapted to make continuous contact with said layer of material as it moves under said roller with said conveyer belt, said roller rolling thereover, a pair of slip rings on said roller, each of said slip rings being electrically connected to one of said contact rings, and stationary brushes engaging and making sliding electrical connection with said slip rings, said brushes being adapted to be connected to a source of electric potential and in circuit with a measuring means, whereby measurement of an electrical characteristic of said particulate material between said contact rings is achieved, the moisture content of said material being related thereto.

2. Apparatus for measuring the moisture content of a traveling layer of particulate material which comprises a movable conveyer belt or the like on which said particulate material is adapted to be carried in the form of a layer the thickness of which may vary, a frame extending thereabove, a bracket articulately connected to said frame and extending downwardly toward said conveyer, a roller rotatably mounted in said bracket adjacent said conveyer so as to be movable into yieldable engagement with the top surface of the layer of material thereon, a pair of contact rings uniformly spaced apart on the layer-engaging surface of said roller and adapted to make continuous contact with said layer of material as it moves under said roller with said conveyer belt, said roller rolling thereover, a pair of slip rings on said roller, each of said slip rings being electrically connected to one of said contact rings, and stationary brushes mounted on said bracket and engaging and making sliding electrical connection with said slip rings, said brushes being adapted to be connected to a source of electric potential and in circuit with a measuring means, whereby measurement of an electrical characteristic of said particulate material between said contact rings is achieved, the moisture content of said material being related thereto.

3. A device used in the measurement of the electrical resistance of material relatively movable with respect to the device in the form of a layer the thickness of which may vary comprising a support, a drum mounted on said support so as to be rotatable about its axis and adapted to engage and roll over the surface of the layer of said material, a pair of slip rings on the side of said drum, a pair of conductive rods extending from said slip rings into said drum substantially parallel to the axis thereof, each of said rods being electrically connected to a slip ring, a pair of contact rings uniformly spaced apart on the periphery of said drum and adapted to make continuous contact with said layer of material as it moves relative to said drum, securing means passing through said contact rings in position on the periphery of said drum, said securing means for each of said contact rings being electrically conductive and being electrically connected to an appropriate one of said conductive rods so that each of said slip rings makes electrical connection with a different one of said contact rings, and stationary brushes mounted on said support engaging and making sliding electrical connection with said slip rings as said drum rotates.

4. A device used in the measurement of the electrical resistance of material relatively movable with respect to the device in the form of a layer the thickness of which may vary comprising a support, a drum mounted on said support so as to be rotatable about its axis and adapted to engage and roll over the surface of the layer of said material, a pair of slip rings on the side of said drum, a pair of conductive rods extending from said slip rings into said drum substantially parallel to the axis thereof, each of said rods being electrically connected to a slip ring, a plurality of contact rings uniformly spaced apart on the periphery of said drum and adapted to make continuous contact with said layer of material as it moves relative to said drum, securing means passing through said contact rings and into said drum so as to hold said contact rings in position on the periphery of said drum, the securing means for each of said contact rings being electrically conductive and securing means for alternate contact rings being electrically connected to different ones of said conductive rods, each of said slip rings thus being electrically connected to alternate ones of said contact rings, and stationary brushes mounted on said support and engaging and making sliding electrical connection with said slip rings as said drum rotates.

5. Apparatus for continuously measuring the moisture content of a traveling layer of particulate material which comprises a movable conveyer belt or the like on which said particulate material is adapted to be carried in the form of a layer the thickness of which may vary, a member urged toward said conveyer, a pair of conductive contact elements carried by said member and adapted to engage and make continuous contact with said layer of material as it moves under said member with said conveyer belt, and terminals electrically connected to said contact elements and adapted to be connected to a source of electric potential and in circuit with a measuring means, whereby continuous measurement of an electrical characteristic of said particulate material between said contact rings is achieved, the moisture content of said material being related thereto.

6. Apparatus for continuously measuring the moisture content of a traveling layer of particulate material which comprises a movable conveyer belt or the like on which said particulate material is adapted to be carried in the form of a layer the thickness of which may vary, a member urged toward said conveyer so as to be movable into engagement with the top surface of the layer of the material thereon, a pair of conductive contact elements uniformly spaced apart on the layer engaging surface of said member and adapted to make continuous contact with said layer of material as it moves under said member with said conveyer belt, and terminals electrically connected to said contact elements and adapted to be connected to a source of electric potential and in circuit with a measuring means, whereby continuous measurement of an electrical characteristic of said particulate material between said contact rings is achieved, the moisture content of said material being related thereto.

7. Apparatus for continuously measuring the moisture content of a traveling layer of particulate material which comprises a movable conveyer belt or the like on which said particulate material is adapted to be carried in the form of a layer the thickness of which may vary, a member urged toward said conveyer, a plurality of uniformly spaced apart conductive elements carried by said member and adapted to engage and make continuous contact with said layer of material as it moves under said member with said conveyer belt, and terminals electrically connected to said contact elements and adapted to be connected to a source of electric potential and in circuit with a measuring means, whereby continuous measurement of an electrical characteristic of said particulate material between said contact rings is achieved, the moisture content of said material being related thereto.

8. Apparatus for continuously measuring the moisture content of a traveling layer of particulate material which comprises a movable conveyer belt or the like on which said particulate material is adapted to be carried in the form of a layer the thickness of which may vary, a member urged toward said conveyer so as to be movable into engagement with the top surface of the layer of material thereon, a plurality of conductive elements uniformly spaced apart on the layer-engaging surface of said member and adapted to make continuous contact with said layer of material as it moves under said member with said conveyer belt, and terminals electrically connected to said contact elements and adapted to be connected to a source of electric potential and in circuit with a measuring means, whereby continuous measurement of an electrical characteristic of said particulate material between said contact rings is achieved, the moisture content of said material being related thereto.

BILLY STEWART McKINLEY.

References Cited in the file of this patent

UNITED STATES PATENTS

| Number | Name | Date |
|---|---|---|
| 2,197,823 | Young | Apr. 23, 1940 |
| 2,227,625 | Benbow | Jan. 7, 1941 |
| 2,270,732 | Jones | Jan. 20, 1942 |
| 2,291,071 | Bruno | July 28, 1942 |
| 2,328,853 | Sherrard | Sept. 7, 1943 |
| 2,527,815 | Hart | Oct. 31, 1950 |
| 2,532,929 | McBrayer | Dec. 5, 1950 |

FOREIGN PATENTS

| Number | Country | Date |
|---|---|---|
| 47,820 | Norway | Dec. 28, 1931 |

OTHER REFERENCES

Worth (abstract), Ser. No. 702,720, published July 12, 1949.